(12) United States Patent
Moles

(10) Patent No.: US 6,424,823 B1
(45) Date of Patent: Jul. 23, 2002

(54) CELL PHONE WITH INTEGRATED PERSONAL MIRROR

(75) Inventor: Bryan J. Moles, Dallas, TX (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/501,469

(22) Filed: Feb. 9, 2000

(51) Int. Cl.⁷ ................................................ H04B 1/38

(52) U.S. Cl. .................... 455/90; 455/550; 379/433.11; 379/433.1; 379/433.01; 379/433.13

(58) Field of Search ........................ 455/575, 90, 566, 455/550, 128, 351; 379/428.01, 428.02, 433.01, 433.1, 433.11, 433.13

(56) References Cited

U.S. PATENT DOCUMENTS

| | | | | |
|---|---|---|---|---|
| 5,367,309 A | * | 11/1994 | Tashjian | 455/90 |
| 5,566,224 A | * | 10/1996 | Ul Azam et al. | 455/90 |
| 5,970,418 A | * | 10/1999 | Budd et al. | 455/550 |
| 6,052,606 A | * | 4/2000 | Bowen | 455/566 |

FOREIGN PATENT DOCUMENTS

JP          10-93674    *  4/1998 .................. 455/550

* cited by examiner

*Primary Examiner*—Doris H. To

(57) ABSTRACT

There is disclosed a cellular telephone comprising: 1) a handset case; 2) a display associated with the handset case capable of displaying alphanumeric characters when the cellular telephone is operated; and 3) a personal mirror associated with the cellular telephone.

14 Claims, 2 Drawing Sheets

CELL PHONE WITH INTEGRATED PERSONAL MIRROR

TECHNICAL FIELD OF THE INVENTION

The present invention is directed, in general, to wireless devices and, more specifically, to a cellular telephone with a built-in personal mirror.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones are used primarily for voice conversations between a subscriber and another party through the wireless network. These cell phone handsets are smaller and lighter in weight than their predecessors and provide more features. In fact, the newest generations of handsets are often small enough to fit inside a shirt pocket while also providing several display lines of alphanumeric characters.

As handsets approach a nominal convenient small size, manufacturers continue to search for cost-effective features that may distinguish their particular handset configurations from handsets produced by other vendors. For instance, handsets were initially black in color, but handsets of one or more colors and patterns are now readily available. Cell phones also come with numerous accessories that provide a user with ergonomic advantages or personal convenience enhancements to the user, such as leather carrying cases, ear plugs or headphones, recharging units, and the like.

There is a need in the art for additional cost-effective ergonomic and/or personal enhancements that a cell phone manufacturer may add to cellular phones in order to distinguish the manufacturer's products.

SUMMARY OF THE INVENTION

To address the above-discussed deficiencies of the prior art, it is a primary object of the present invention to provide a cellular telephone (or other cordless telephone handset) that contains an integrated personal (or vanity) mirror. According to one embodiment of the present invention, there is provided a cellular telephone comprising: 1) a handset case; 2) a display associated with the handset case capable of displaying alphanumeric characters when the cellular telephone is operated; and 3) a personal mirror associated with the cellular telephone.

According to one embodiment of the present invention, the cellular telephone further comprises a handset cover associated with the handset case.

According to another embodiment of the present invention, the handset cover is rotatably coupled to a portion of the handset case.

According to still another embodiment of the present invention, the personal mirror is disposed on a surface of the handset cover.

According to yet another embodiment of the present invention, the personal mirror is removably mounted on a surface of the handset cover.

According to a further embodiment of the present invention, a portion of the handset cover forms a compartment and the personal mirror covers the compartment when the personal mirror is removably mounted on the handset cover.

According to a still further embodiment of the present invention, the cellular telephone further comprises a light source associated with the handset cover.

According to a yet further embodiment of the present invention, the light source is activated when the handset cover is rotated away from the handset case.

In one embodiment of the present invention, the handset cover further comprises a microphone.

In another embodiment of the present invention, the personal mirror is mounted on a portion of the handset case.

In still another embodiment of the present invention, the personal mirror at least partially covers the display.

In yet another embodiment of the present invention, the reflectivity of the personal mirror is variable.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
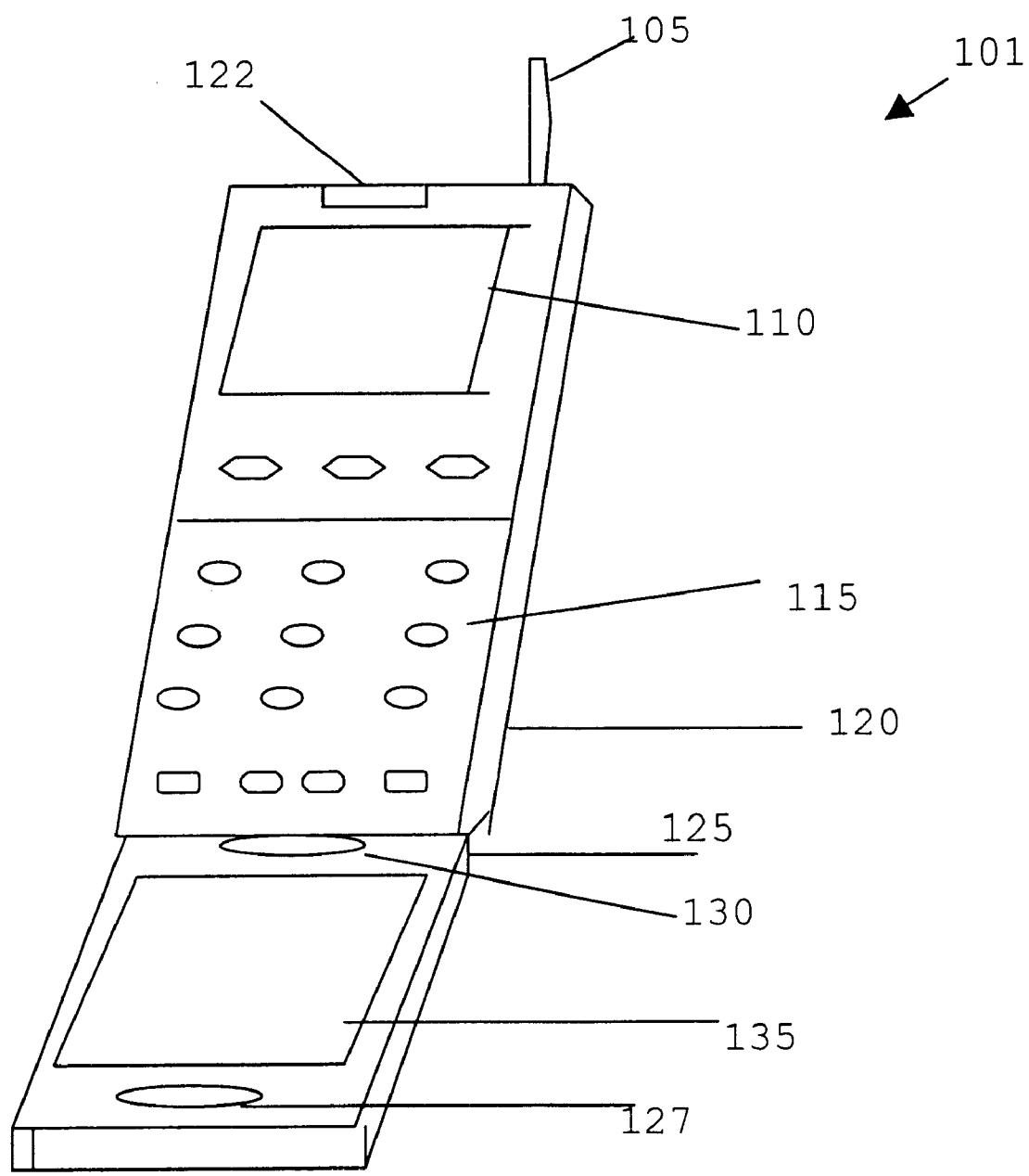
FIG. 1 illustrates an exemplary wireless communication handset incorporating an integrated personal mirror according to one embodiment of the present invention.
Figure 2:
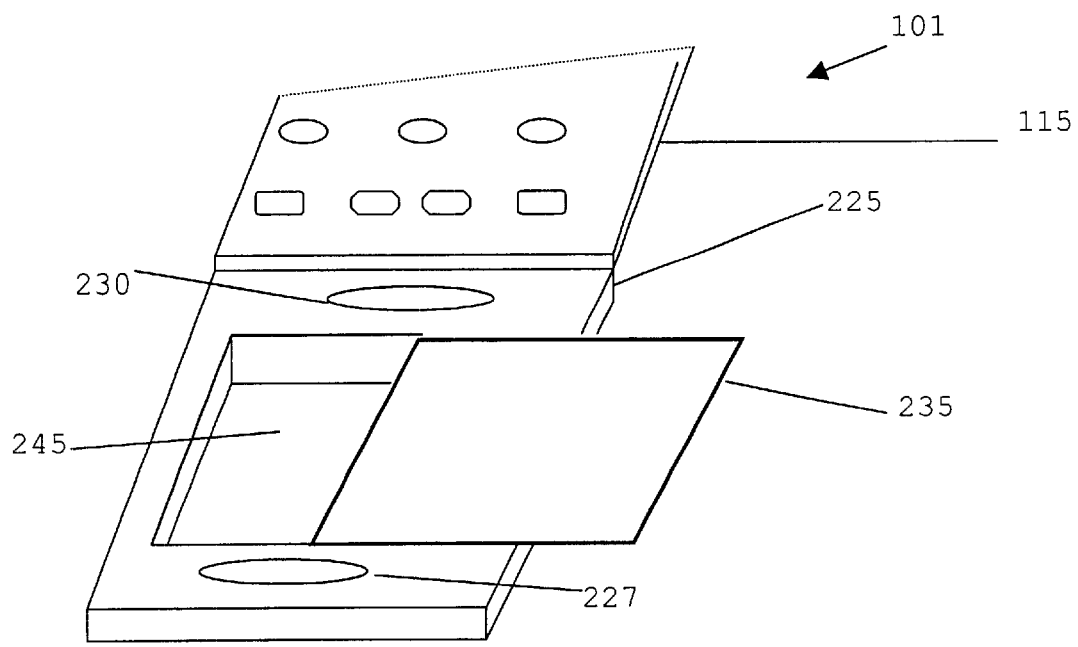
FIG. 2 illustrates an exemplary wireless communication handset incorporating an integrated mirror according to a second embodiment of the present invention.

FIG. 1 and FIG. 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged cellular telephone.

FIG. 1 illustrates an, exemplary embodiment of a communication handset with an integrated personal mirror. Handset 101 comprises transmit/receive antenna 105, alphanumeric display 110, keyboard 115, handset case 120, speaker 122, handset cover 125, microphone 127, optional mirror illuminator (light) 130, and exemplary personal mirror 135. Handset case 120 provides an enclosure for a majority of the circuitry associated with handset 101. The operations of antenna 105, display 110, keyboard 115, handset case 120, speaker 122, and microphone 127 are well known in the art and need not be discussed in greater detail.

Handset cover 125 provides a cover for all or a portion of the user control and display associated with handset case 120. Optionally, handset cover 125 may also serve as the enclosure and protection for a portion of the circuitry associated with handset 101. Typically, handset cover 125 may cover keyboard 115 as protection against inadvertent entry of key strokes, while leaving display 110 available for constant viewing.

In one embodiment, handset cover 125 may comprise at least one mirror illuminator 130 for illumination of personal mirror 135 and the user's face. In an advantageous embodiment of the present invention, illuminator 130 is a low power light bulb that automatically illuminates when handset cover 125 is rotated away from handset case 120. Personal mirror 135, located on a surface of handset cover 135, serves as a vanity mirror, providing a reflection of the user. Personal mirror 135 may be manufactured from a variety of reflective materials. In one preferred embodiment, personal mirror 135 may be manufactured from a durable, light weight reflective film such as reflective Mylar. Personal mirror 135 provides the ability for the handset holder to conveniently view his or her image without the need for a separate mirror.

FIG. 2 illustrates an exemplary embodiment of a portion of handset 101, which includes a sliding mirror and a convenience compartment. In this embodiment, handset 101 comprises handset cover 225, microphone 227, optional mirror illuminator 230, sliding personal mirror 235, and convenience compartment 245. Sliding personal mirror 235 covers convenience compartment 245, with convenience compartment 245 being exposed when personal mirror 235 is moved from the cover position. In one embodiment, convenience compartment 245 may have space for notes, coins, paper currency, cosmetics, or other small objects.

In another embodiment, handset cover 225 and personal mirror 235 may be configured so that the mirror is hinged on one edge to mechanically attach to the handset cover 225. When personal mirror 235 is placed in the up or open position, convenience compartment 245 may be accessed, as previously described.

It will be understood by those familiar with the art, that other configurations of handset 101 with personal mirror 135 (or 235) are possible. For instance, although the foregoing disclosure describes the placement of a personal mirror 135 (or 235) on a handset cover containing a microphone, it is understood that the handset cover may not include a microphone. Further more, in one embodiment, personal mirror 135, may be incorporated in a handset case 120, rather than handset cover 125.

For example, in one embodiment of the present invention, personal mirror 135 may be made of a material of variable reflectivity that covers display 110. When power is OFF, personal mirror 135 fully reflects light to show the user's image. However, when power is ON, the reflectivity of personal mirror 135 is greatly reduced so that personal mirror 135 becomes mostly (or completely) transparent. Characters and symbols on display 110 will then be visible through mirror 135.

In another embodiment, personal mirror 135 may be made of a reflective material that may cover a portion of the reverse side of handset case 120, providing a reflection of the user's image.

In still another embodiment, personal mirror 135 may be include decorative or other features which are otherwise available in mirrors. In one embodiment, one or more edges of personal mirror 135 may be beveled. In another embodiment, personal mirror 135 may be completely or partially configured to provide a reflective image with magnification.

Although the present invention has been described in detail, those skilled in the art should understand that they can make various changes, substitutions and alterations herein without departing from the spirit and scope of the invention in its broadest form.

What is claimed is:

1. A cellular telephone comprising:

a handset case;

a handset cover associated with said handset case, wherein a portion of said handset cover forms a compartment;

a display associated with said handset case capable of displaying alphanumeric characters when said cellular telephone is operated; and a personal mirror associated with said cellular telephone wherein said personal mirror covers said compartment in said handset cover.

2. The cellular telephone as set forth in claim 1 wherein said handset cover is rotatably coupled to a portion of said handset case.

3. The cellular telephone as set forth in claim 2 wherein said personal mirror is removably mounted with respect to said compartment.

4. The cellular telephone as set forth in claim 2 further comprising a light source associated with said handset cover.

5. The cellular telephone as set forth in claim 4 wherein said light source is activated when said handset cover is rotated away from said handset case.

6. The cellular telephone as set forth in claim 2 wherein said handset cover further comprises a microphone.

7. The cellular telephone as set forth in claim 2 wherein said handset cover at least partially covers said display.

8. The cellular telephone as set forth in claim 1 wherein a reflectivity of said personal mirror is variable.

9. A cellular telephone comprising:

a handset case comprising:

a display capable of displaying alphanumeric characters when said cellular telephone is operated;

a keypad capable of receiving keystroke inputs from a user of said cellular telephone; and a speaker;

a handset cover rotatably coupled to said handset case and capable of at least partially covering at least one of said display and said keypad when said handset cover is rotated towards said handset case, wherein a portion of said handset cover forms a compartment; and a personal mirror associated with said cellular telephone wherein said personal mirror covers said compartment.

10. The cellular telephone as set forth in claim 9 wherein said personal mirror is removably mounted with respect to said compartment.

11. The cellular telephone as set forth in claim 9 further comprising a light source associated with said handset cover.

12. The cellular telephone as set forth in claim 11 wherein said light source is activated when said handset cover is rotated away from said handset case.

13. The cellular telephone as set forth in claim 9 wherein said handset cover further comprises a microphone.

14. The cellular telephone as set forth in claim 9 wherein a reflectivity of said personal mirror is variable.

* * * * *

UNITED STATES PATENT AND TRADEMARK OFFICE
CERTIFICATE OF CORRECTION

PATENT NO. : 6,424,823 B1
DATED : July 23, 2002
INVENTOR(S) : Bryan J. Moles

It is certified that error appears in the above-identified patent and that said Letters Patent is hereby corrected as shown below:

Column 3,
Line 60, after "may" delete -- be --.

Signed and Sealed this

Tenth Day of June, 2003

JAMES E. ROGAN
*Director of the United States Patent and Trademark Office*